(12) United States Patent
Stark et al.

(10) Patent No.: US 8,825,225 B1
(45) Date of Patent: Sep. 2, 2014

(54) AERIAL DISPLAY SYSTEM WITH FLOATING PROJECTION SCREENS

(71) Applicant: Disney Enterprises, Inc., Burbank, CA (US)

(72) Inventors: James Alexander Stark, South Pasadena, CA (US); Robert Scott Trowbridge, La Canada, CA (US); Clifford Wong, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 33 days.

(21) Appl. No.: 13/768,955

(22) Filed: Feb. 15, 2013

(51) Int. Cl.
*G03B 21/00* (2006.01)
*G06F 19/00* (2011.01)

(52) U.S. Cl.
USPC .................. 701/2; 701/4; 701/24; 353/70

(58) Field of Classification Search
USPC ........ 701/2, 4, 23, 24; 353/10, 70, 7, 121, 37; 348/51; 359/458, 462
See application file for complete search history.

(56) References Cited

U.S. PATENT DOCUMENTS

2006/0290897 A1\* 12/2006 Engle et al. ..................... 353/70
2008/0239243 A1\* 10/2008 Hasegawa et al. .............. 353/30

\* cited by examiner

*Primary Examiner* — Tan Q Nguyen
(74) *Attorney, Agent, or Firm* — Marsh Fischmann & Breyfogle LLP; Kent A. Lembke

(57) ABSTRACT

A system for presenting an aerial display over an audience of spectators. The system includes a plurality of unmanned aerial vehicles (UAVs) and a plurality of flexible projection screens. Each of the screens is supportable in a display air space by the UAVs. The system includes a ground control system with a processor executing a fleet manager module and with memory storing a different flight plan for each of the UAVs. During operation during a display time period, the UAVs execute the flight plans to move and to position the flexible projection screens within the display air space. The flexible projection screens each may include a mesh body configured to have low wind resistance and to provide a projection surface for reflecting light. The system may include a projector projecting light onto the projection surface of at least one of the flexible projection screens during the display time period.

20 Claims, 7 Drawing Sheets

AERIAL DISPLAY SYSTEM WITH FLOATING PROJECTION SCREENS

BACKGROUND

1. Field of the Description

The present invention relates, in general, to aerial displays and control of unmanned aerial vehicles (UAVs) such as multicopters, and, more particularly, to an aerial display system using UAVs to provide a synchronized aerial display with floating or flying projection screens and/or scrims.

2. Relevant Background

For many years, there has been continued interest in creating new ways to project light and imagery and to otherwise provide aerial displays. In many settings, a laser lighting display or laser light show may be used to entertain an audience using laser light. The projected laser light or laser beams may be set to or synchronized to music. Laser light has proven useful in indoor and outdoor settings because the coherent nature of laser light allows a narrow beam to be produced that can then be used with optical scanning to draw or project patterns or images on walls, ceilings, or other surfaces including theatrical smoke and fog without refocusing as is common with video projection.

More recently, it has become popular to create outdoor light shows or displays using buildings as projection surfaces. For example, a Symphony of Lights is a synchronized light and laser multimedia display that uses the exterior surfaces of forty-four buildings on both sides of the Victoria Harbor of Hong Kong for projection surfaces to create imagery that is accompanied by music. This large scale display has attracted over 4 million visitors and is held every night for over ten minutes. The show includes flashes of laser lights and projected color patterns along with sweeping search lights/projection lighting as well as stationary lights provided on the buildings themselves (e.g., light emitting diodes (LEDs)).

The use of building surfaces allows a display designer to provide a large scale light show or projected display. However, there are major limitations to such a show as it requires use of display or projection surfaces that are fixed in size and location (e.g., static surfaces), and this fixed backdrop makes it very difficult to create new effects and shows and can only provide a limited aerial display (e.g., only can display to the height of the tallest available building) that may be detrimentally affected by features on or part of the building outer surfaces. Further, use of buildings as projection surfaces is only useful in certain geographical settings, such as within large cities near water or other open spaces, and is often inapplicable in many settings in which an aerial display is desired, such as over a sports stadium or theme park where no or few tall buildings may be present. As a result, there remains a need for new technologies for generating aerial displays such as a display involving projection of light and images into or out of the sky or an air space above an audience of spectators.

SUMMARY

Briefly, the following description introduces an aerial display system (and methods implemented with such systems) for providing dynamic aerial displays. The display system may include one or more projectors (e.g., for projecting light or an image) and one or more flexible and portable display screens or scrims. The display system further includes numerous unmanned aerial vehicles (UAVs) used to support and position the display screens or scrims from above (with tethered lines or wires) or from below (with rods or the like).

Further, the display system includes a ground control station running a fleet management module or program to choreograph the movement of the UAVs and for controlling (in some cases) operation of the projectors to provide a dynamic aerial display by selectively projecting lights and/or images onto the moving and/or selectively positioned display screens or scrims. Although in some applications, a controller may be provided for the projector(s) and/or other show components such as to select media to project and synchronize projection with a show routine or program that may provide an accompanying soundtrack. The movement of the screens/scrims by the UAVs in a flocking or synchronized manner may provide an aerial display in of itself with lighting or other projected imagery enhancing or changing the visual effect (e.g., providing or changing colors or patterns of the projection surfaces of these floating/flying scrims) of the moving screens/scrims in an air space viewable by an audience.

More particularly, a system is provided for presenting an aerial display over an audience of spectators. The system includes a plurality of unmanned aerial vehicles (UAVs) and a plurality of flexible projection screens. Each of the screens is supportable off the ground in a display air space by one or more of the UAVs. The system also includes a ground control system with a processor executing a fleet manager module and with memory storing a different flight plan for each of the UAVs. During operation during a display time period, the UAVs execute the flight plans to move and to position the flexible projection screens within the display air space.

In some applications, the flexible projection screens each include a mesh body configured to have low wind resistance and to provide a projection surface for reflecting light. In these applications, the system may include a projector projecting light onto the projection surface of at least one of the flexible projection screens during the display time period. Further, in such applications, the projector may be adapted to track movement of the at least one of the flexible projection screens to project the light onto the projection surface while the flexible projection screen is positioned at two or more positions or orientations in the display air space.

In some implementations, the flexible projection screens each includes an emissive display with air passageways to reduce wind resistance. In these implementations, the emissive displays may each comprise a plurality of spaced apart light rods connected via a flexible frame, and the flexible frames may include tether points for connection to the UAVs. The light rods may each include a plurality of sets light emitting diodes selectively operable to emit differing colors along a length of the light rod. In some cases, the flight plans are downloaded pre-flight to each of the UAVs, and, during the display time period, the UAVs may independently and concurrently execute the downloaded flight plans. Further, the flight plans may be downloaded pro-flight to each of the UAVs. Then, during display time period, the UAVs may independently and concurrently execute the downloaded flight plans and the fleet manager module may communicate instructions to each of the UAVs to control operation of the UAVs during the performance of the aerial display.

DETAILED DESCRIPTION

Figure 1:
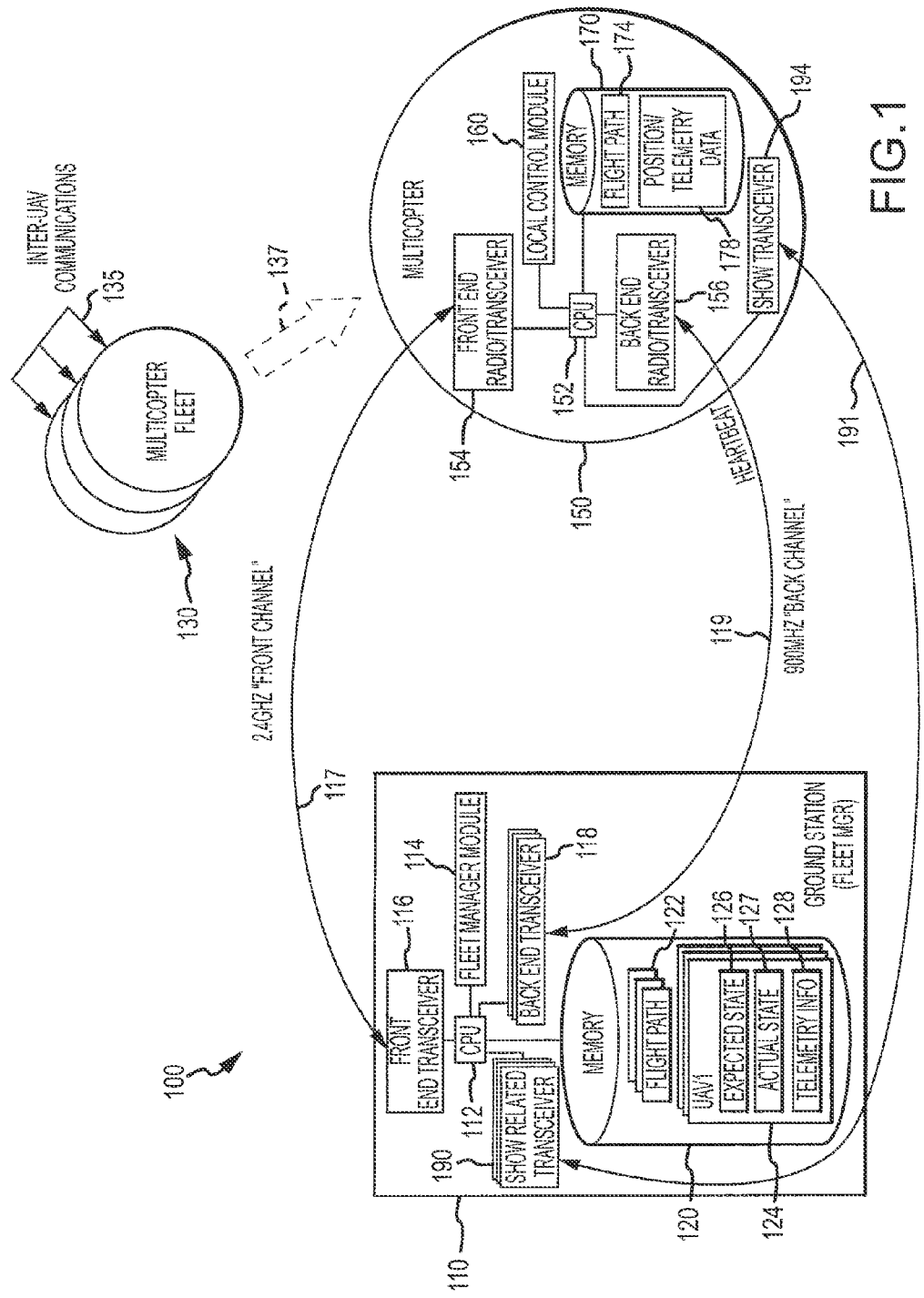
FIG. 1 is functional block diagram of a multiple UAV system useful for implementing the flight control techniques described herein.

Briefly, the present description is directed toward an aerial display system with a ground control station/system that wirelessly controls and choreographs movement of a plurality of unmanned aerial vehicles (UAVs) such as multicopters. Each of the UAVs is used to carry by itself or as part of a team or set of UAVs a projection screen or scrim as a display payload. The scrim-supporting UAVs are used to position and fly/move one or more of the projection screen or scrims within a display air space such as over a lagoon, over a park, or over sporting arena field. The UAVs may be controlled by a fleet manager module (or a show control computer program) of a ground control system (GCS) or other computing device to fly in a flocking and/or synchronized manner (non-swarming control) to create 2D or, more typically, 3D displays.

With the aerial display systems described herein, new methods for providing dynamic displays are introduced or taught to the entertainment industry. The display or projection screen can be made up of one, two, three, or many flexible and positionable projection screens carried by one to four or more UAVs. In this way, the display screen can be changed during a display period as one or more of its parts or components (i.e., flying projection screens) moves with its supporting UAVs. The display screen can be made to appear and disappear as it is deployed without a fixed infrastructure as was the case with projection onto building exteriors. The material of the projection screens may be reflective (as is the case for many projection surfaces) or may be emissive or a combination of reflective and emissive projection screens may be used in an aerial display system of the present description.

In some embodiments, a single projector may be used to project imagery or light (e.g., switching colored light onto the scrims or flying projection screens). In other cases, multiple projectors are provided that may each project on differing projection screens or two or more projectors may project their light onto a single projection screen with their light blending to achieve a desired effect. The aerial display system may be configured to project onto one or more scrims that are each suspended by or between two or more UAVs. The aerial display system may be thought of as including a screen, suspension wires, and aerial vehicles, with the suspension wires attached at one end to a tether point of the screen and at the other end to one of the aerial vehicles or UAVs.

The aerial vehicles may use relatively precise localization to maintain their position (e.g., a series of way points defining a flight path provided by a flight plan stored in their local memory or provided on an ongoing basis via a ground control station) such as by employing differential GPS, inertial measurements, and/or visual localization. Vehicle positions may also be monitored by fixed visual tracking devices (e.g., as used in motion capture devices/systems). All this position-related information makes it possible to provide accurate projection from one, two, or more projectors (e.g., positioned on or near the ground) onto one-to-many mobile projection surfaces provided by surfaces of the flying scrims (or projection screens). Localization may be used so that the displayed image can track movement of the scrim within the display air space, and localization can also be used so that the projected imagery/light may remain fixed when the scrim moves to achieve a differing effect or display result.

In some embodiments, the projection screen carried by the UAVs is a mesh so that air can readily pass through to reduce the sail effect and wind resistance during positioning of the screens in a display air space. In an alternative form, the projection screens are each configured to be an emissive display (e.g., to project light without the need for a projector to project light onto their surfaces). For example, LEDs along thin wires or straps may be used to emit color pixels (e.g., sets of red, green, blue LEDs may be provided across a surface of the projection screen with each set being used as a color pixel of the projection screen). This may be similar to a standard LED display except that there are relatively large gaps between the rows or emissive lines of the projection screen such that wind resistance is lower (e.g., air gaps or spaces between at least some of the LED lines/rows).

The scrim or projection screen does not need to include a heavy frame as the material of the scrim is allowed to be flexible and to move with the supporting UAVs. The direction of, and tension within, the tethering/support wires or lines may be measured and control of the UAVs modified as needed to obtain or maintain a predefined tension direction and/or amount for each of the tethering lines during a light show or operation of the aerial display system (e.g., a predefined location of each UAV as well as line tension amount and tension direction may be maintained by local and/or ground controls of the UAVs at each way point or at select points in time during the show or display routine). In some cases, the scrim is allowed to move more freely or to have slack as a flapping scrim may be desirable with relatively free movement with the wind. In others, though, the scrim may be held relatively steady by applying more tension on the tethering wires or through other devices such as saddle curves.

The projection screens may be floated and positioned by a variety of flying objects. In some embodiments, the flying object is a UAV such as, but not limited to, a multicopter. In such aerial display systems, a multicopter is modified or used to carry a projection screen or scrim via a tethering or support wire or line (from above) or a connecting rod or stiffer support element each which may be connected to a tether point of the screen/scrim. Further, the aerial display system may be controlled so that each multicopter is aware of other multicopters in their vicinity and is also able to be controlled by flocking logic via a ground station or ground control system (GCS). In this manner, each multicopter may work in conjunction with a first number of multicopters to position and move a projection screen (with or without a desired amount of slack or tension in its projection surface) and with a second number that are acting to carry other projection screens to create a larger display screen or screen assembly in a display air space. Significantly, each multicopter is aware of other multicopters in the vicinity, and all multicopters are controlled by a centralized show program or controller (e.g., a fleet control module or show program running/executed on a ground control system (GCS) or ground station and/or on a media/lighting controller used to operate one or more projectors and/or emissive display screens).

Since a plurality of multicopters may be used to implement an aerial display system, it may be useful to first discuss a control method and system (or multiple UAV systems incorporating such control methods/systems) for use in controlling a flock of UAVs numbering 2 to 10 or more UAVs (e.g., 10 to 100 or more multicopters). This discussion of a control method may then be followed by specifics on particular implementations of aerial display system that may or may not use multicopters.

Briefly, the control method uses hierarchical-based supervisory control with multicasting techniques along with adaptive logic including onboard or local control modules provided on each UAV to adjust flight paths to safely avoid collisions based on communications with nearby UAVs. The result of the described control of the multiple UAVs in an airspace such as over a theme park or stadium is a flocking behavior in which the UAVs appear to move in a synchronized manner with movements that may not be completely independent nor completely centrally controlled (or may be independent and/or centrally controlled in some cases). The control method may be implemented in a system with four general components or pieces: a fleet management station (or ground station); flying objects or UAVs; at least dual-path communications between the ground station and the UAVs (e.g., much of the description below highlights use of dual-channel communication but some embodiments may use three or more transceivers onboard a UAV (such as to provide a front channel (supervisory), a back channel (autonomous), and a show channel (lighting, payload actuators, and so on); and stage/show management. These four components or aspects of the control method/system are described below with reference to the figures.

First, with regard to dual-path communications, FIG. 1 illustrates a system 100 that may be used to control flying objects in a safe and repeatable manner. The system 100 includes a ground station or fleet manager 110 along with a plurality of multicopters (or UAVs) 130, with each being implemented (as shown via arrow 137) with the configuration of multicopter 150. As shown, the fleet of multicopters 130 is configured for inter-UAV or multicopter communications 135, and, as explained below, this intercommunication allows the multicopters 130 to safely react to a determination that another multicopter 130 is in a close proximity to avoid collisions while generally remaining on a predefined flight path. During runtime, ground station/fleet manager 110 is used for sending commands to maintain show performance and quality and to monitor safety information. During non-runtime, it uploads the show requirements.

Dual-path communication between the ground station 110 and the multicopter 150 is provided by each flying object or multicopter 150 having two communication channels shown at 117 and 119 in FIG. 1. To this end, the ground station 110 includes a front-end radio or transceiver 116 and a back end radio or transceiver 118, and the multicopter 150 also has two radios 154 and 156 configured for communicating 117, 119 with the station radios 116, 118. Some embodiments may further include a show radio or transceiver 190 in the ground station 110 that communicates over show channel 191 with a radio/transceiver 194 on the multicopter 150. The first or front end channel 117 provides a high speed communications channel (e.g., 2.4 GHz or the like) that is useful to provide choreographed movement of the multicopters 150 (e.g., when the UAVs 130 are not simply following a flight path but have time-synchronized movements from position to position in an airspace).

For example, the front channel 117 may be thought of as a robust, low-bandwidth "primary" channel for synchronized motion control and manual override control by the ground station. The back channel 119 may be thought of as a "secondary" high-bandwidth channel. The back channel 119 may be used for transmitting telemetry from the multicopter 150 to the ground station 110, for the ground station 110 to transmit signals for supervisory control of the multicopter 150, and for a back up communication channel should the front end channel 117 fail to one or more of the multicopters 150. Further, the show channel 191 may be used for non-flight-related communications.

The ground station 110 is shown to include a processor(s) 112 that runs software to perform the ground station control functions discussed herein such as the fleet manager module 114. The processor 112 controls operations of the radios/transceivers 116, 118 including managing memory 120 to store data received from the multicopter 150 over channel 117, 119. The memory 120 is shown to store flight paths 122 that may be downloaded or provided over front end channel 117 to the multicopter 150 (of those in fleet 130) for use by a local control module 160 to control movement of the multicopter 150 (e.g., via selectively throttling of motors turning one or more of the rotors). The memory 120 also stores a set or file of data 124 for each multicopter 150 of a fleet 130, and the data 124 may include an expected state 126 for the multicopter 150, an actual state 127 of the multicopter 150, and other telemetry data 128 (which may be passed via the back end channel 119 to the ground station 110).

Each multicopter 150 is shown to include one or more processors 152 that control operation of the two radios 154, 156 so as to process received data/signals on channel 117, 119 and to, as appropriate, store data in onboard memory 170. The processor 152 also may run or execute code, programs, or software such as a local control module 160 to perform the UAV-control functions described herein. The memory 170 may be used to store a flight path 174 provided by the ground station 110 and to also store determined positions and telemetry data 178 (that may be provided to the ground station 119 as shown in memory 128). The telemetry data 178 may include a heartbeat (each UAV in fleet 130 indicates to the ground station that is operational or "alive"). The telemetry data 178 may further include a present position of the multicopter 150 (e.g., a three dimensional location in the airspace) and the present speed of the multicopter 150. Further, the telemetry data 178 may include the health of any monitored components on the multicopter 150 and a battery life/status as well as other monitored data.

The fleet management component or module 114 acts to monitor the expected state 126 and the actual state 127 each of the flying objects 150. For example, the module 114 may compare a present position or traveling speed of a multicopter 150 with its expected state 126 (which may be defined by a flight path 122 or a choreographed and time-synchronized movement of UAVs 130 such as in a light or other aerial display/show). Based on this monitoring, the fleet management module 114 may make adjustments such as using the following priorities: localization (e.g., position of the multicopter 150 with respect to other UAVs/multicopters); environment (e.g., to adjust for high wind conditions or the like); safety (e.g., return the multicopter 150 to a safe location or operating mode if it or other UAVs are not operating as expected); show performance (e.g., adjust position, speed, or other operating parameters to meet show needs); fleet status; and operator convenience/performance needs.

As discussed above, the fleet management module 114 and local control module 160 are configured to work together to provide flocking-type control. In use, the inter-UAV communications 135 are used to allow operational data to flow or spread hierarchically among the UAVs 130 rather than relying upon centralized/ground control alone. In other words, the fleet management module 114 provides a level of centralized control or central logic that acts to control the movement of the UAVs/multicopters 130 such as by providing flight paths 122 and/or making real time adjustments based on a comparison of expected state 126 and actual state 127 (or for safety reasons). With regard to inter-UAV communications, it may be useful to note the following: (a) some units may be designated as master nodes talking with the fleet manager; and (b) the master nodes may operate to send out in-flight calculated information or commands to remaining UAVs.

The movement/control is not swarm-based control in part because swarming UAVs can collide or have an inherent lack of safety and because the system 100 is designed to avoid random movements and provided a flock or synchronized movements among the multicopters 130, 150. However, the inter-UAV communications 135 as processed and generated by the local control module allows each multicopter 150 to react safely to environment conditions such as increasing or direction-changing wind and presence/movement of neighboring multicopters 130, 150 as crossing flight paths is allowed in the system 100 (e.g., may be required by flight paths 122). In other words, the onboard logic 160 acts to control the multicopter 150 movements so as to avoid collisions while attempting to stay generally on the flight path 174.

Figure 2:
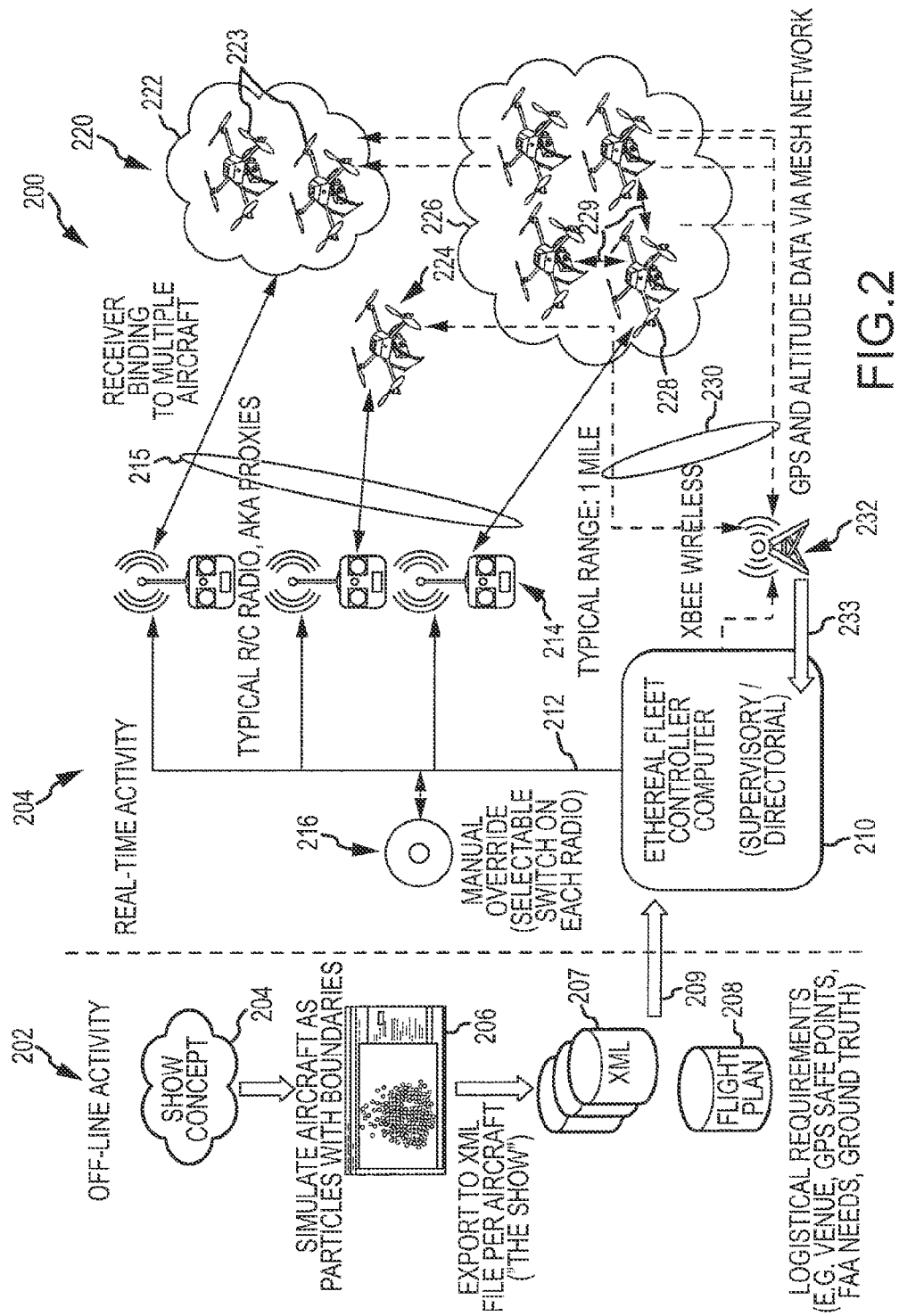
FIG. 2 is a functional schematic or block diagram of a system for use in providing flight management or flight control over two or more flying objects such as UAVs.

FIG. 2 illustrates a system (or a flight management control system) 200 for use in managing or controlling UAVs to provide an aerial vehicle flock with synchronized flight. The system 200 is shown to be made up of or include components used to perform off-line activity at 202 and used to perform on-line activity at 204. The off-line activity 202 may include designing or selecting a show concept or choreographed movement 204 for a plurality of UAVs to achieve a particular effect or perform a task(s).

The show concept (e.g., digital data stored in memory or the like) 204 may then be processed with a computer or other device to simulate as particles with spatial boundaries as shown at 206. For example, each multicopter to be used to provide an aerial display or show (or to perform an aerial task) may be modeled as a particle, and a three dimensional space such as a sphere with a predefined diameter may be used to define a safety envelope for that UAV or flying object. The safety envelope or space is used to reduce the risk of a collision between two UAVs (e.g., create and choreograph a show to avoid collisions and not allow two UAVs to have their safety envelopes intersect/overlap as the UAVs move along their flight paths).

The created show or task for the multiple UAVs is then exported to memory or other devices as shown at 207 for processing, with this "show" typically including a file per each UAV or unmanned flying object. Each of these files is processed to generate real world coordinates for each UAV to be achieved over time during a show (or performance of a choreographed task(s)). This processing creates individual flight plans 208 for each UAV, and such processing or generating of the flight plans 208 may include processing the modeled show 207 based on specific logistical requirements. These requirements for example may modify a show to suit a particular venue (e.g., is the air space the same size and shape as in the simulation and, if not, modification may be useful to change or set real world coordinates for one or more of the UAVs).

The logistical requirements may also include setting a ground truth for the venue and adding safe or "home" points (e.g., with GPS or other location settings) where each vehicle can be safely positioned such as at the beginning and end of a show or when a safety override is imparted (e.g., "return to home"). The stage/show management component 202 may be considered a component that translates central show controller commands, which may be a foreign system, to fleet actions that are sent 209 to the fleet management component either through scripts (e.g., data files), real time computer messages, and/or hardware triggers.

Figure 3:
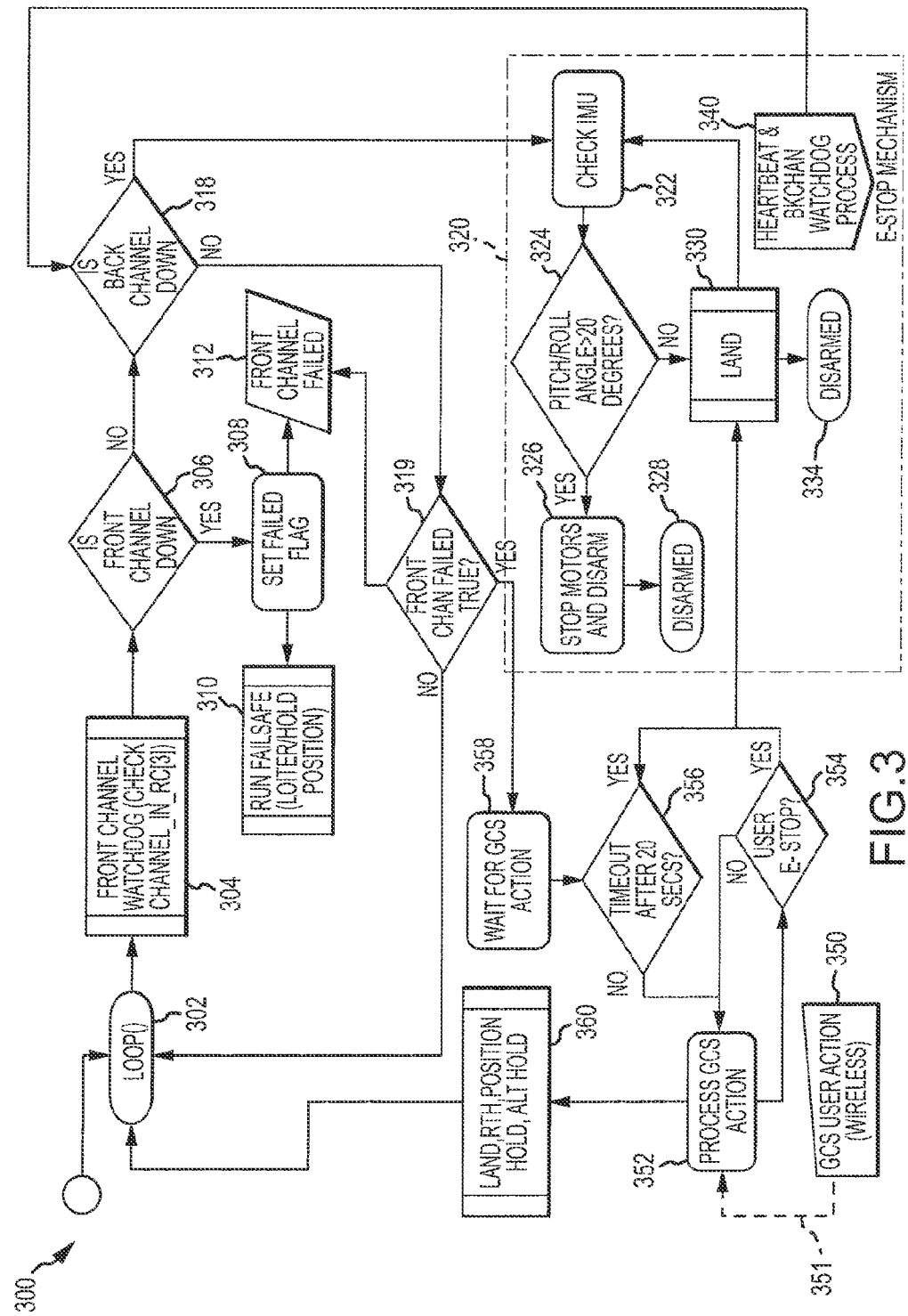
FIG. 3 provides a logic diagram for the onboard logic running or provided for execution on each UAV such as part of a multicopter control panel/board.

At 209, the flight plans are provided to the ground station 210 (or ethereal fleet controller/computer or ground control system (GCS) as used in FIG. 3). The system 200 further includes a number of UAVs 220 shown in the form of multicopters in this example. The multicopters 220 may be in groups/sets with set 222 shown to include two copters 223, set 224 including one copter, and set 226 includes four copters. These sets may act or function together, at least for a portion of a show or flight path, to perform a particular display or task.

In other cases, all of the multicopters may be considered part of a large set that moves as a flock or otherwise has its movements time synchronized and/or choreographed by flight plans 208. As shown at 229, a multicopter 228 in the group 220 can communicate with its nearby or neighboring multicopters so as to determine their presence, to determine their proximity, and when needed, to process the flight plan, determined neighbor position, and other environmental data to modify their flight plan to avoid collision and/or communicate 229 with the neighboring multicopter to instruct it to move or otherwise change its flight plan/movement to avoid collision.

As discussed with reference to FIG. 1, the system 200 also includes two communication channels between the GCS 210 and each of the multicopters 220. The front end channel is shown at 212 with the GCS using remote control radios or wireless transceivers 214 to communicate data/control signals 215 to each of the multicopters 220. In this manner, the GCS or receiver 210 binds to multiple aircraft so as to allow multicasting of control signals such as to wirelessly load flight plans 208 to each of the multicopters 220 before flight operations are initiated by the GCS 210.

In some cases, a manual override (selectable switch, for example, on each radio 214) 216 is provided to allow an operator to signal 215 a particular multicopter 220 to switch to safe mode (e.g., to return to home, to safely drop to ground, and so on). The back end channel for communications is shown at 230 with each of the multicopters 220, which may have two or more radios as discussed with reference to FIG. 1, communicating telemetry or other data (e.g., GPS and altitude data via a mesh network) to the GCS 210 as shown to be relayed 233 via a wireless transceiver device 232 (e.g., with a range when working with UAV radios of about 1 mile). Each multicopter 220 may include a unique identifier or ID with their telemetry data (e.g., the same ID as used to associate a flight plan 208 with a particular multicopter 220).

In system 200, each of the flying objects 220 may be a multicopter that optionally may be modified to carry a variety of payloads (or units). For example, the payload may be one or more lights sources. The payload may include the communication devices, e.g., two or more radios discussed herein, to provide multiple communication channels. Any communication channel may be linked to the GCS 210 (or its fleet management module discussed above with reference to FIG. 1). In one implementation, the multicopters 220 were each modified via software (e.g., local control module 160 in FIG. 1) to provide all the logic (e.g., see FIG. 3 and corresponding discussion) required for operation in a show environment including flocking logic, safety strategies, light show scripts, character expression logic, and alternative show maneuvers.

FIG. 3 illustrates a flowchart or logic diagram of a safety control method or logic 300 that may be implemented on board each multicopter or flying object (e.g., via the local control module 160 as shown for a multicopter 150 in FIG. 1). In the safety process 300, a process loop begins at 302 and a first step may be to perform a check of the front end communication channel at 304. At 306, the process 300 continues with determining whether the front channel is still up/available or is now down. If determined at 306 to be down, a flag is set at 308 indicating the front end communication channel has failed as shown at 312.

At this point, the process 300 may continue at 310 with controlling the multicopter in a failsafe mode as shown at 310, and this may involve having the multicopter loiter or hold its present position for a preset period of time, until the front end channel is available (as determined by repeating step 304), or until instructed otherwise by GCS user action 350 (e.g., an operator may identify a loitering multicopter in the group/flock and instruct it to take certain action such as to return to home (RTH)).

The process 300 may include an emergency stop cycle or subroutine 320. In the stop cycle 320, an ongoing (frequent periodicity) step 340 a heartbeat of the multicopter may be performed. In this step 340, the logic/processor onboard may transmit an "alive" pulse/signal to the GCS and also determine its present position and other telemetry, which is also transmitted to the GCS via the back end communication channel. As part of step 340, a check is performed to determine a status of the back end channel to the GCS. The following are examples of multiple modes of failure that may result in different reactions: (a) show failure (e.g., missed waypoint) to which the system may respond by adapting to stay safe and continue flight; (b) front channel communication failure to which the system may respond by going to autonomous mode to stay safe and possibly cancel a show if needed; (c) back channel communication failure to which the system may respond by waiting for confirmation and hold in place until communication is reestablished (if not, then land); and (d) full communication failure to which the system may respond by landing in place.

After step 340 is performed, the method 300 continues at 318 with a determination of whether or not the back channel is down. If not, the method 300 can continue at 319 with a determination of whether or not the front channel flag 312 is set. If not, the method 300 can return to perform another loop 302. If the front end flag is set at 312 (fail is true) as determined at 319, the method 300 may continue at 358 with waiting for a control signal or action to be performed by the GCS (e.g., an operator uses the GCS to transmit a control signal). At 356, a determination is made regarding a timeout after a preset period of time.

If the timeout period has not elapsed, the method 300 continues at 352 with processing of a GCS action that is provided by wireless signal/transmission 351 from the GCS 350. A user or operator may provide input at a ground station or GCS to perform a user-initiated emergency stop, which is checked for at 354. If an e-stop is not issued in the transmission 351 as determined at 354, the method 300 may continue at 352 with further processing of the action 350 such as to determine that instructions have been received to operate the multicopter in a particular manner.

These responses/actions are shown at 360 with the local/onboard control logic acting to land the multicopter, to return the multicopter to home, to hold the present position (but changing altitude is allowed), to hold altitude (but wind or other environmental conditions may cause position to change over time), or other action. This step 360 is followed with a new control/safety loop 302. In this manner, a user can provide at 350 override or direct control signals to each multicopter that can override a program/flight plan at any time or in response to loss of the front end communication channel. When a timeout period has elapsed at 356, the e-stop cycle 320 may be performed. In particular, the onboard logic may act to land the multicopter as shown at 330 if no GCS action is received within the present time (e.g., 10 to 30 seconds or the like).

The e-stop cycle 320 may also be initiated when it is determined by the onboard control logic at 318 that the back end channel is down. In such a case, step 322 is performed to check the IMU and then determine at 324 whether the pitch or roll angle is greater than some preset acceptable limit (e.g., 15 to 30 degrees or more). If this pitch is not exceeded, the e-stop cycle 320 continues at 330 with landing the multicopter. If the pitch or roll angle is greater than the preset maximum at 324, the e-stop cycle 320 continues at 326 with stopping the motors and otherwise "disarming" the multicopter to place it in a disarmed state at 328 (at which point the multicopter will fall to the ground rather than gently landing as is the case at 330).

With the above discussion and general discussion of a flight control system (system 100 and 200) understood, it may be useful to more specifically discuss functions of particular components of such a flight control system and the onboard logic and controls of each multicopter or other UAV. With regard to the ground control system (GCS), the GCS controls preflight, show state, and safety.

During preflight, an operator uses the GCS to load a flight plan onto each UAV (e.g., transmitted wirelessly via the front end channel for storage in memory accessible by the local control module of the UAV). During a show, the GCS and its fleet manager module acts to run the flight plan previously loaded on the UAV. This "running" may involve an operator using a trigger module or mechanism of the fleet manager module to say start or "go" to initiate all the multicopters or UAVs to begin to run a flight plan. Typically, before this step, each UAV is placed at a ground location for takeoff or at an aerial home position, with these home or start positions being included in the overall flight plan for a show or to perform a task as a flock of UAVs.

During the show, the GCS actively monitors safety and an operator can initiate a GCS user action as shown in FIG. 3. More typically, though, the GCS monitors the operation of all the UAVs in the flock by processing the heartbeat and telemetry data provided by each of the UAVs via the back channel communications from the back end radio or transceiver provided on each UAV. In some embodiments, the fleet manager module has software/logic that compares the actual state of each UAV against the expected state at that particular time for the UAV according to the presently enacted flight plan.

If the actual state does not compare favorably (e.g., the position of the UAV is outside an acceptable range such as several-to-many feet off course), the fleet manager module may generate an alert (audio and/or visible) on a GCS monitor or other linked device to warn an operator of this possibly unsafe condition. At this point, the warned operator may take action (user action in FIG. 3) to correct the operations of the UAV(s) or to instruct the UAV to return to home or take other actions.

For example, the fleet manager module may allow the operator to select or "hit" a safety button (or selectable icon), and the fleet manager module would communicate via the front end or back end communication channel to instruct the UAV to go into a predefined safety mode of operation (e.g., see box 360 of FIG. 3). This safety mode instruction or GCS is processed by the local control module on the UAV, with the UAV drive system correspondingly operated to position the UAV in a safe location or mode of operation. Such a safety mode/operation can be issued on a per UAV basis or to the entire flock concurrently (or even to a subset of such a flock). In some embodiments, the fleet manager module actively negotiates with each UAVs local control module (or its subroutine handling safe operations); in other words, hitting the "safety button" on the GCS does not necessarily require the affected UAV to immediately take action as the UAV control system may act to complete a task or first attempt a control adjustment to correct its operations prior to allowing GCS override (such as causing the UAV to return-to-home).

After the "go" or start signal is issued by the fleet manager module/GCS upon an operator input, the GCS along with the local control software/hardware on each UAV work to safely perform the preloaded flight plan/show. As discussed above, the control method and system taught herein combines centralized control (e.g., to allow manual override for safety or other reasons during a show/flight-based task) with smart UAVs to more effectively provide flock-type movement of the UAVs. In other words, the UAVs may each be given a particular flight plan that they work toward over time (during a show time period) while attempting to respond to environmental conditions such as changing wind or the unexpected presence of another UAV within or near to their safety window (or safe operating envelope surrounding each UAV such as a sphere of several-to-many feet such as 10 to 30 feet or the like in which no other UAV typically will travel to avoid collisions).

During operations, the GCS is used to trigger each of the UAVs to begin their stored flight plan starting from a home or show/task start point (e.g., each UAV may be placed at differing launch points or be hovering/flying at a particular ground point at a predefined start altitude). In some cases after the "go" is received by a UAV, each UAV uses its local control module (or other software/programming) to attempt to follow the flight plan but with no time constraints. In other words, the flight plan may define a series of earth points or way points along with elevation/altitude values for the UAV. In these embodiments, the UAV is controlled in a relatively fluid manner and not tied to accomplishing tasks in a certain amount of time (e.g., the flight plan does not require the UAV be at a particular location at a particular time after the go signal is received).

In some implementations such as those using multicopters for the UAVs, the flight plan is built up assuming that each UAV travels at a preset and constant flight speed. This flight speed may be set independently for each UAV or may be the same (or within a relatively small range) for each of the UAVs. In other cases, though, the local control module may be adapted to adjust the flight speed to suit the environmental conditions.

For example, stronger winds may make it beneficial to speed up (or at least operate rotors of a multicopter) when moving against a strong head wind and to slow down when moving with the strong tail wind. The speed of the wind may be determined at the UAV with the local control module and sensors provided as part of the payload or the wind direction and speed information may be provided by the GCS to each of the UAV. In some cases, flock control is preferred such that each UAV has its speeds adjusted commonly, e.g., each UAV runs at like flight speeds while moving in a like direction so as to appear to have synchronized and non-random movement.

In some embodiments, each UAV acts independently to try to continue to follow its own flight plan. Each flight plan differs at least in the fact that each UAV begins at a differing start point or home and moves toward its first way point. To this end, each UAV is equipped as needed to determine its present three dimensional position that includes a latitude/longitude position (e.g., a GPS position or similar position data) along with its present altitude or height above the ground. The local control module uses this present position data to modify (if necessary) its present direction or heading to continue to move toward the next way point in its flight plan. This may involve changing it course and also its angle of attack to reach the desired height at the way point.

Generally, the GCS monitors for safe operations of the UAVs as discussed with reference to FIG. 3, but an operator may take steps to manually override a particular one of the many UAVs to provide better control of that UAV. For example, the fleet control module of the GCS may operate to compare an expected position of the UAV with its actual position (provided via back end channel in its telemetry or other data). A warning may be provided in a GUI that the UAV is trending off course or is outside an accepted tolerance for reaching its next way point.

For example, the GUI may show properly operating and positioned UAVs in green, UAVs that are off course or out of position a safe amount in yellow, and UAVs outside of a safe envelope in red. The red/unsafe UAVs may be handled automatically or manually to cause them to enter a safe mode of operation (return to home, for example). The yellow UAVs that are operating outside of desired conditions, though, may be manually operated to try to assist them in returning to their flight path such as by manually changing speed, direction, angle of attack, or the like to more quickly bring the UAV to a desired way point. After manual operations are complete, the control may be returned from the GCS to the local control module for local control of the UAV based on the flight plan stored in its memory. Note, the GCS may be configured to evaluate collision issues and execute collision avoidance commands to preserve show quality (i.e., flight performance) in degrading weather conditions.

In other embodiments, a local control module of a UAV may operate to adjust the flight plan during flight to better react to environmental conditions (such as gusts of wind that may throw it, at least temporarily, off course). For example, a flight plan may provide a time relative to a start time (when "go" was signaled by the GCS to the UAVs) to reach each of its way points on the flight plan. One embodiment may call for the UAV to determine a distance to a next UAV and its present estimated time of arrival (e.g., using changes in its earth position to determine its true speed or rate of travel). If the time of arrival is not within a window about a preset/goal arrival time, the local control module may act to increase the flight speed of the UAV such as by increasing the rate of rotation for the rotors of a multicopter. Likewise, if the UAV is moving too quickly (e.g., strong tail wind), the UAV's local control module may act to slow the flight speed. In this manner, the movement of the UAVs may remain better synchronized to provide a flock control.

In other cases, though, the local control module of the multicopter or other UAV acts to determine whether or not a way point was reached within a predefined time window, with the flight plan defining times for being at each way point relative to a start/go time. If not (e.g., did not reach a way point at Time "X" plus an allowable delay), the local control module may act to modify the flight plan by directing the UAV to skip the next way point and fly directly to the way point following the next. For example, a flight plan may include way points A to Z. If a local control module determines that a predefined time window for way point C was not achieved, the local control module may skip or remove way point D from the flight plan and cause the UAV to take a direction/course (e.g., a straight line or other predefined path) to way point E. In this way, the flight speed is maintained (e.g., all UAVs fly at the same speed) while allowing the UAV to "catch up" if they fall behind their flight plan (e.g., defining a set of way points or earth points to pass through or nearby within a predefined time period that may correspond with a time to perform a show/display or perform a task with the multicopters).

With regard to safety and monitoring of operations, each UAV may store a definition of a geofence that defines an outer perimeter (and an inner area in some cases) or boundary of a geographical area. The UAV's local control module compares the present position determined for the UAV during a flight and compares this position to the geofence. If this boundary is crossed (or is being approached such as within a preset distance from the geofence), the local control module may act to promptly return the UAV back within the geofence boundaries. In other cases, the UAV may be switched into a safe operating mode (as discussed with reference to FIG. 3), and this may cause the UAV to return-to-home or otherwise safely return to ground (or other safe holding position). For example, the geofence may define the boundaries of a lagoon or stadium field, and the UAVs may fly over this geographical area (or within an area offset from the physical boundaries of this area to define a somewhat smaller area) but not outside it so as to avoid flying directly over any people in an audience to provide enhanced viewing safety.

Further, regarding safe UAV operations, some embodiments of flight control method and system involve configuring the UAVs to have UAV-to-UAV (or multicopter-to-multicopter) communications or other technologies provided onboard to avoid collisions without reliance upon the GCS to intervene. Each UAV may use its local control module to operate on an ongoing basis to detect when another UAV comes within a predefined distance from the UAV such as within a sphere of 10 to 30 feet or the like. The first UAV to detect such a condition (or both UAVs if a tie) generates a collision warning message and transmits this message to the offending/nearby UAV to alter its course or present position to move out of the first UAV's air space. For example, the UAV receiving such a collision warning message may store an evasive action in its memory and initiate this action (a fixed movement such as angling to the right or left a preset angle). The evasion may be taken for a preset time period and then the UAV may return to following its flight plan (e.g., recalculate a course to the next way point from its new present location or the like).

As discussed with regard to FIG. 3, the local control module of each UAV may perform other functions to control its own flight to ensure safe operations. For example, the local control module uses a front end radio and a back end radio to communicate with the fleet manager module of the GCS. The status of these communication channels is monitored by the local control module, and, when either communication channel is detected to be lost (e.g., an expected receipt confirmation from the GCS is not received to a transmission of a telemetry data by a UAV), the local control module may react to this loss of communication by entering a safe operating mode (e.g., land, return to home, hold position, or the like).

In another example, the UAV's local control module monitors the present orientation and/or altitude of the UAV and if the orientation is outside an acceptable range (e.g., pitch or roll exceeds 20 degrees or the like for a multicopter) or if the altitude is too high or too low, the local control module may also act to enter the UAV into a safe operating mode (before or after attempting to correct the operating problem).

Figure 4:
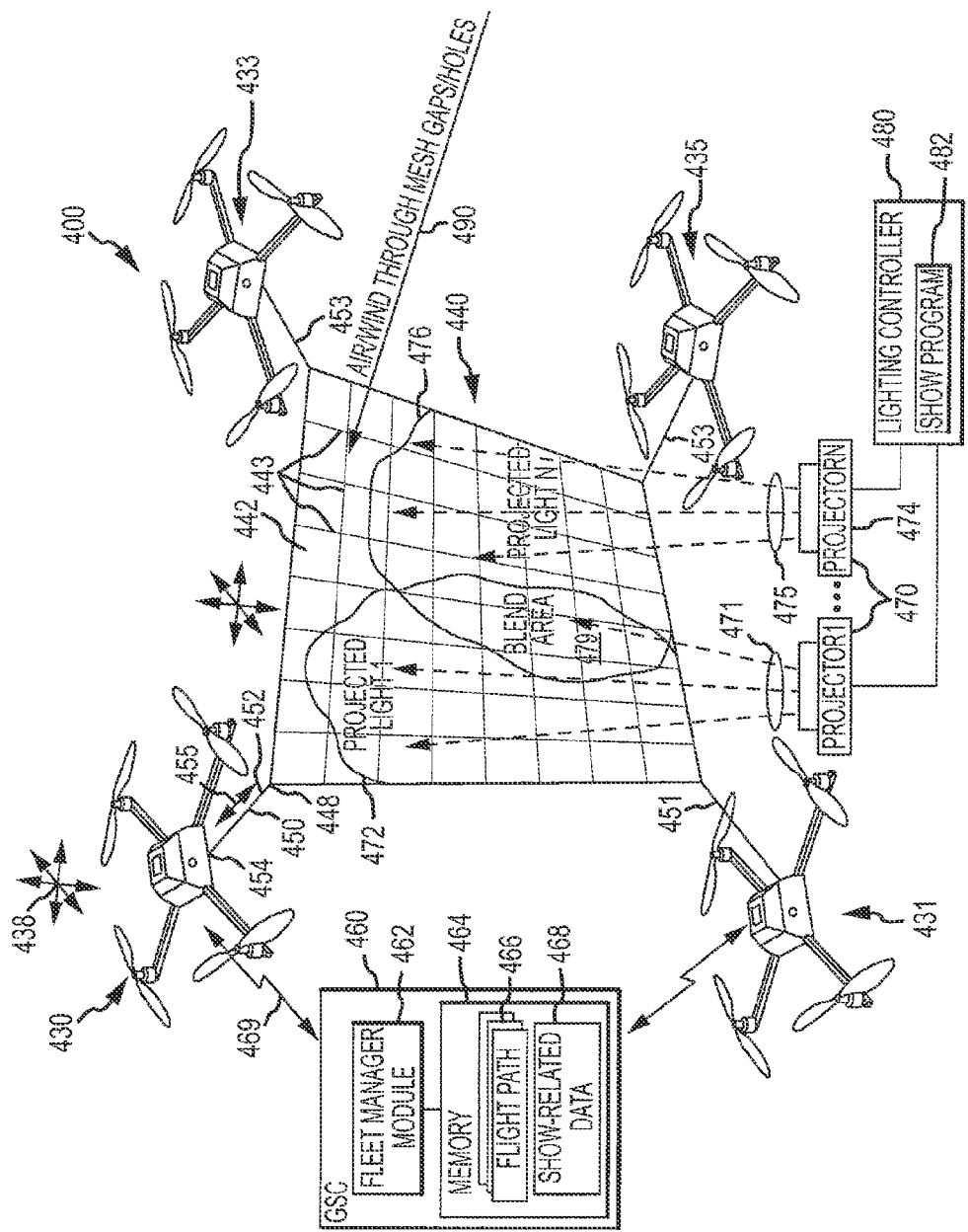
FIG. 4 illustrates an exemplary aerial display system of the present description during use to provide an aerial light show with a number of UAVs supporting a flexible projection screen or scrim within a display air space.

With the above understanding of control of UAVs understood, it may be useful to again turn to a discussion of aerial display systems using UAVs such as multicopters to position and/or fly one-to-many flexible and air-permeable projection screens throughout a display air space. FIG. 4 illustrates an aerial display system 400 during its use to provide an aerial display involving projection of light (e.g., colored light, still images, animated images, or the like) onto a floating or flying projection surface.

As shown, the system 400 includes a set or team of UAVs (here, shown to be multicopters as an example) 430, 431, 433, and 435. As discussed above, each of the UAVs 430, 431, 433, 435 may move in any direction as shown for UAV 430 with arrows 438. The movement 438 of each UAV 430, 431, 433, 435 is controlled via communications 469 with a ground control system (GCS) 460 such as the systems and methods described above with reference to FIGS. 1-3. This may involve the GCS 460 executing a fleet manager module 462 with access to memory 464 to control each UAV 430, 431, 433, 435 to follow a flight path 466 (which may be downloaded 469 prior to the flight operations to provide an aerial display).

The flight paths 466 define for each UAV 430, 431, 433, 435 where to fly and/or hover throughout an aerial display with system 400. This, in turn, causes the UAVs 430, 431, 433, 435 to act as the manipulator or puppeteer for a flexible projection screen 440 they support as a group (or puppeteer team or assembly). In addition to the control and other telemetry data used by the fleet manager module 462 to control the UAVs 430, 431, 433, 435 (as discussed with reference to FIGS. 1-3), the communications 469 may provide the fleet manager module 462 with additional show-related data 468 that may be used to modify the flight path/plan 466 and/or otherwise control the UAVs 430, 431, 433, 435 during operation of the system 400 to provide an aerial display.

For example, the show-related data 468 may include the presently measured tension of a support or control wire/line 450 for a UAV 430. If this is too great (screen 440 in too much tension or too taut), the UAV 430 may be controlled by the GCS 460 or locally to move to reduce the applied tension via line 450 (e.g., to have the tensile force fall within a predefined tensile force or tension range). Likewise, the tensile force measured at the UAV 430 on line 450 may be too low or out of range low, and the GSC 460 or local controller may operate to move the UAV 430 to apply more tension to the screen 440 via wire/line 450.

Another sensed or measure show-related parameter 468 may be the direction of the tensile force on line/wire 450, 451, 453, 455, and, when these values are out of range or near an end of a desired range of directions, the GCS 460 or local UAV controller may act to adjust the direction and/or speed of travel of the affected UAV 430, 431, 433, 435. In this manner, the puppeteering team of UAVs 430, 431, 433, 435 (and other teams of such UAVs used to support and articulate another projection screen not shown in FIG. 4) acts to not only support the projection screen 440 in a display air space so as to have a desired position and orientation relative to the ground or to projectors 470, 474 but also act as a team or flock to articulate the screen 440 by moving its corners or other tether/link points in a desired manner (e.g., to provide a taut screen, to cause the screen to sag in the middle, to cause a first end to dip and dive, and so on to provide a banner-based show or aerial display).

The aerial display system 400 further includes a flexible projection screen 440. The projection screen 440 may be formed so as to provide at least one projection surface 442, and the system 400 includes one or more projectors 470, 474 that project light 471, 475 onto the surface/side 442 of the projection screen 440. A lighting or projection controller 480 is used to run a show program 482 that controls operation of each of the projectors 470, 474 in a synchronized manner to provide the light 471, 475. For example, the show program 482 may call for the first projector 470 to be operated to project the light (colored or images) onto the surface 442 as shown at 472 and then halt the light 471 and project light 475 (a differing color or image) onto the surface 442 as shown at 476. This may be useful if the screen 440 is moving from one location to another or one orientation to another with the differing positions/orientations being serviced by the differing projectors 470, 474. In other cases, though, both projectors 470, 474 may project onto the surface 442 with their light being blended at least in part of the surface 442 as shown in area 479 of screen surface 442. In some embodiments, the lighting controller 480 acts to track the location (orientation) of the projection screen 440 and/or surface 442, and controls the projectors 470, 474 to follow its movement within a display air space.

The projection screen 440 is supported and positioned in the display air space by the four UAVs 430, 431, 433, 435 via the support wires or tethering lines 450, 451, 453, 455, respectively. For example, the UAV 430 is connected to the projection screen 440 with a first end 452 of the line 450 attached to the tethering or connecting point 448 of the screen 440 (one of its four corners for example when the screen is rectangular in shape). The other or second end 454 of the tether 450 is attached to the underside or side of the UAV 430.

Then, movement 438 of the UAV caused movement 455 and changes in tension in the line 450 and movement and changes in tension of the corner/connection point 448 and screen 440. The movement of the UAVs 430, 431, 433, 435 away from each other increases the tension in the tethering lines 450, 451, 453, 455, which increases the tautness or surface tension of the screen 440 (and the reverse can be used to provide slack in the screen 440). The UAVs 430, 431, 433, 435 may be aligned or positioned so as to be coplanar in some portions of the flight plan/paths 466 such as to provide a vertical projection surface 442 or a planar surface 442 at some desired angle relative to vertical and the projectors 470, 474. The screen surface 442 may even be arranged by UAV movement 438 to be fully or relatively horizontal or parallel to the surface supporting the projectors 470, 474.

Since the screen 440 is being moved through the air, it is typically desirable for it to have a limited or low amount of wind resistance. This is shown at 490 with air/wind being able to flow through the body of the projection screen 440. However, it is also desirable that the projection screen 440 or its surface 442 be reflective of the received/projected light 471, 475. To satisfy both these needs, the projection screen 440 may be formed of a sheet of porous material. In other cases, as shown, the surface 442 is provided with a mesh or loose weave of string, rope, wire, wire rope, or other materials 443 that are spaced apart to provide holes or openings for air 490.

The fineness or amount of spacing between the material 443 (e.g., elongated strips of fabric that reflect the light 471, 475 or the like) may vary to practice the system 400 such as 0.2 to 1 inch or more between reflective or mesh members 443. The spacing may also be varied based on the width or diameter of the members 443 so as to achieve a desired amount of light reflection with projection surface 442 as shown at 472, 476, and 479 (blending of received light from two or more projectors 470, 474). The support wires/lines 450, 451, 453, 455 and screen 440 are both flexible (at least to some degree) to allow the screen 440 to bend and flow with wind 490 and also with movement of the UAVs 430, 431, 433, 435.

As can be appreciated from the above discussion, one useful aspect of a flying/floating projection screen is that it be permeable to air or wind (i.e., not highly wind resistant). This can be achieved with a mesh or loose weave screen as shown for system 400 of FIG. 4, and it can be achieved with other designs such as an emissive display that is configured specifically with gaps or holes for air flow (air passages).

Figure 5:
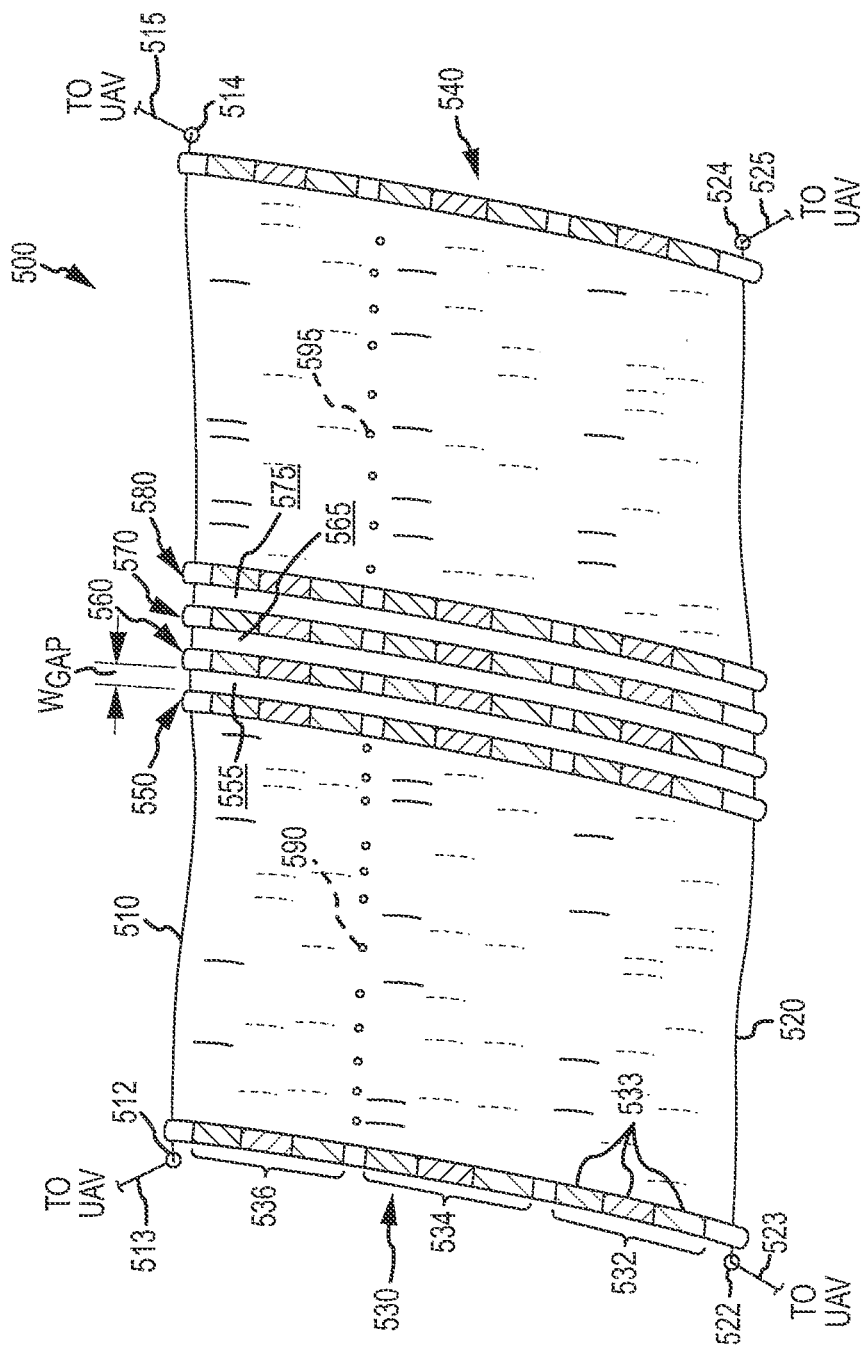
FIG. 5 is a partial view of a flexible projection screen configured as a emissive display that may be positioned with UAVs in a display air space.

With this in mind, FIG. 5 illustrates a projection screen 500 for use with an aerial display system (such as system 400). The projection screen 500 is again "flexible" in that it can bend and move at least along one axis (e.g., bend along its length and/or width when rectangular in shape as shown in FIG. 5). The screen 500 may include a connecting frame that is provided by at least a first or upper connecting or attachment line 510 and a second or lower connecting or attachment line 520. These define outer edges of the screen 500 and may be adapted to provide tether points 512, 514, 522, 524 for connection to tether or support lines 513, 515, 523, 525 that are, in turn, attached to UAVs (not shown in FIG. 5 but may take the form of those shown in FIG. 1-4). The UAVs may be controlled to selectively position and orient the projection screen 500 (relative to the ground, projectors, and/or other projection screen in the same display air space) by moving the 3D or aerial location of the four corneas 512, 514, 522, 524 (and more or fewer tether points and UAVs may be used with screen 500).

The projection screen 500 differs from the screen 440 in that it is configured to project or emit light or as an emissive display device. To this end, the flexible screen 540 is formed of a plurality of emissive light rods or elongated light assemblies 530, 540, 550, 560, 570, 580. For example, the light rod 530 is shown to be an elongated sleeve of three or more light sources/elements 532, 534, 536 extending in a side-by-side or stacked manner in the rod 530. Each light source/element may be formed with one or more lights such as LEDs or the like, with light source/element 532 being shown to include 3 such lights that may take the form of colored LEDs. For example, each light source/element 532, 534, 536 may be considered or controlled as a pixel of the display/screen 500, and each light source such as source 532 may include a number of colored LEDs 533 that may be selectively lit (one at a time or concurrently) as with other emissive displays (e.g., with red, green, blue or other-colored LEDs) to provide a colored display with the flying emissive display or projection screen 500.

The projection screen 500 may be quite large with a height matching the length of the light rods 530-580 such several feet up to 30 feet or more. The width of the screen 500 may also be quite large and readily varied/chosen by providing many of the light rods 530-580 (as shown with dashed lines 590 and 595). The connecting lines 510, 520 may be used to capture the ends (and inner portions in some cases where the rods are relatively long) of the light rods 530-580 to form a sheet or screen for use in an aerial display system. In some embodiments, the additional connecting lines may be provided such as lines/members spaced apart across the whole scrim (i.e., not limited to just lines 510, 520).

The projection screen 500 is adapted to allow air to readily pass through it when supported by UAVs in an air space. To this end, each pair of adjacent light rods is spaced apart by an air gap or passageway. This is shown with interior light rods 550, 560, 570, and 580 that each are spaced apart from adjacent ones by air gaps 555, 565, and 575, respectively, and these air gaps may have a width, $w_{gap}$, chosen to provide a desired lighting output or projected/emitted light from the screen 500 while also allowing adequate air flow to limit its wind resistance during flight. For example, but not as a limitation, the rods 530-580 may have a width or diameter of 0.5 to several inches, and the gap width, $w_{gap}$, may be 0.25 to 6 inches or more between the rods 530-580.

FIGS. 4 and 5 illustrate a single projection screen that may be used in isolation with UAVs to provide an aerial display. However, a more typical aerial display system will include 2 to 10 or sometimes many more projection screens flying and selectively positioned (and orientated) within the air space to provide a synchronized display (e.g., with flock-based control over the UAVs). The projection screens may have light and/or imagery from one or more projectors projected onto them or the projection screens may be emissive displays to provide their own light (or some combination thereof within a single aerial display system). Further, in some cases, the aerial display system may be adapted such that the display or show is fully or at least in part provided by the choreographed movement of the flexible projections screens (or planar display elements/members) in an air space.

Figure 6A:
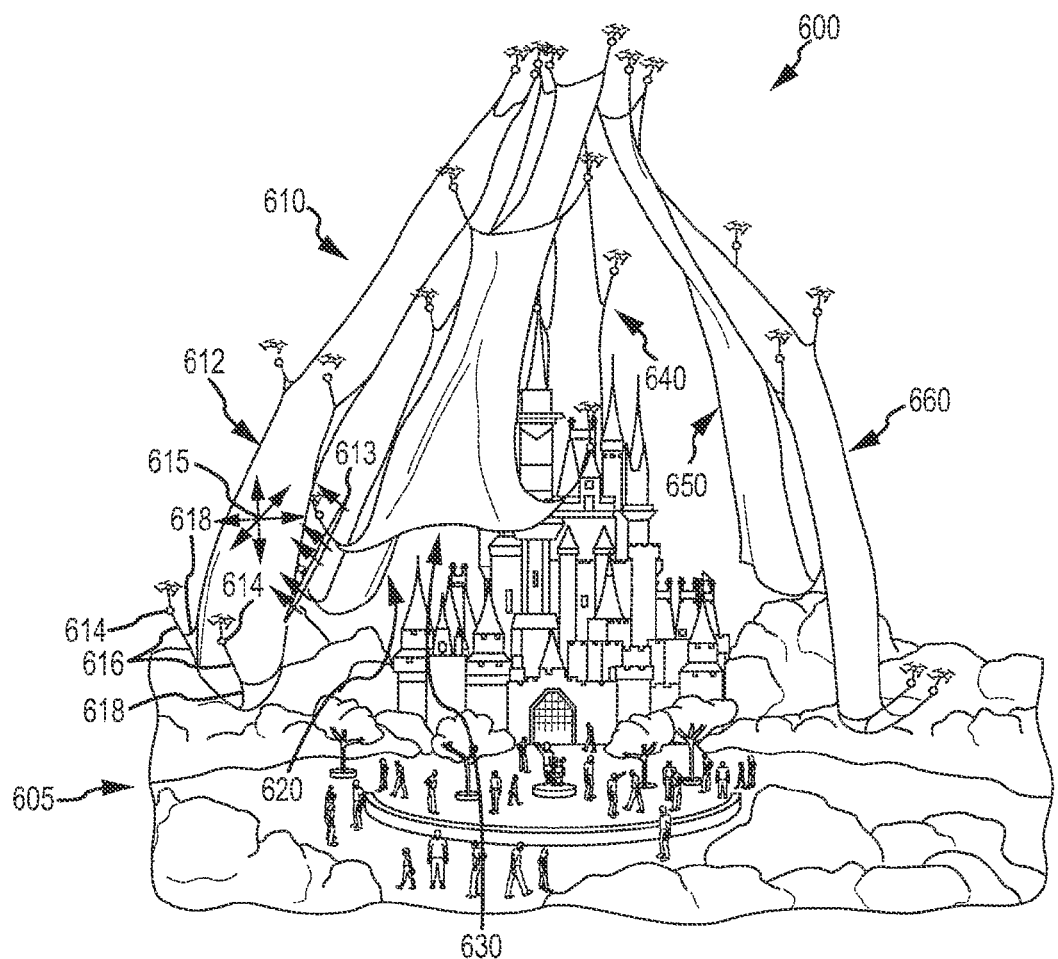
FIGS. 6A and 6B show an aerial display system of one embodiment at two operating states (or operating at two sequential points in time during an aerial light show or display) showing use of UAVs to move and position flexible projection screens/scrims.
Figure 6B:
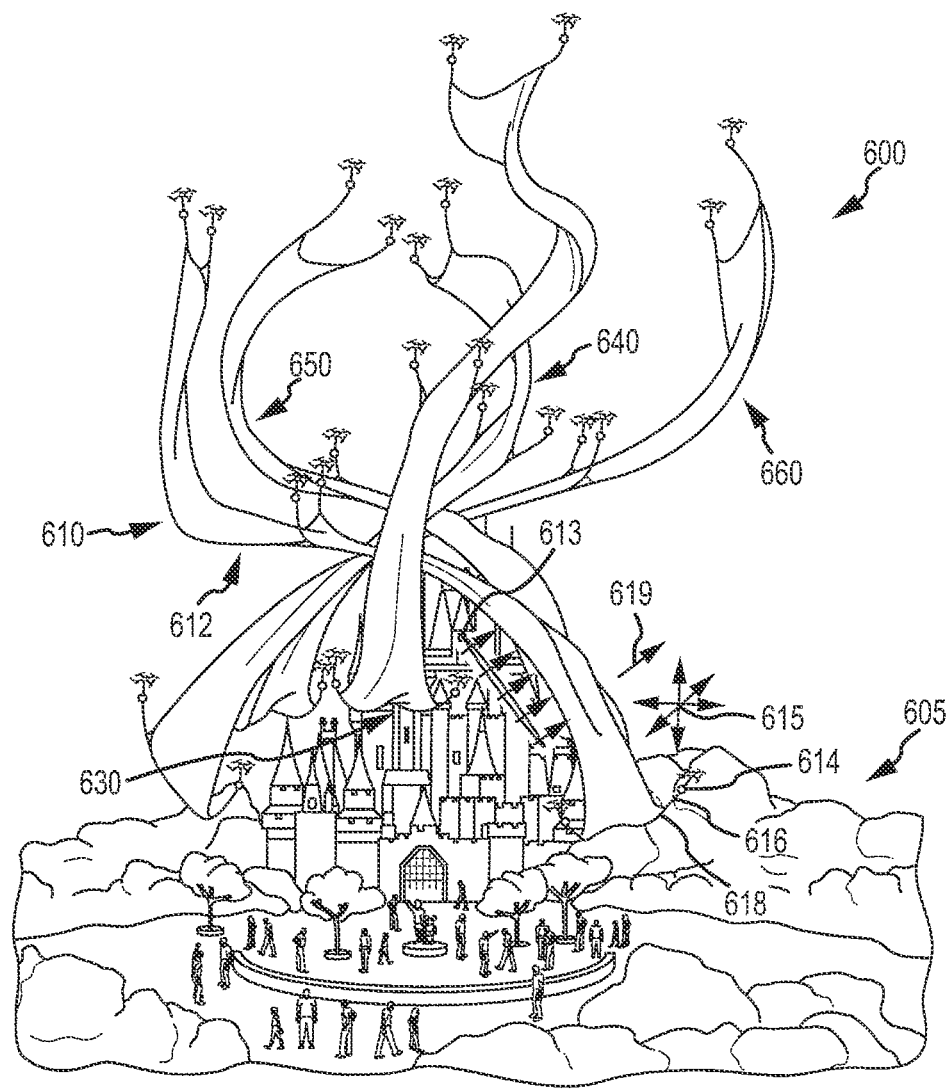

For example, FIGS. 6A and 6B illustrate an aerial display system 600 in first and second operating states. The first operating state of FIG. 6A may correspond with a first point in time or first set of UAV locations within a show program and/or flight plan for the set of UAVs used to fly and position the projection screens within a display air space. The second operating state of FIG. 6B then corresponds with a second point in time or second set of UAV locations within the same show program or flight plan.

As shown, the aerial display system 600 includes a plurality of flexible projection screens 610, 620, 630, 640, 650, and 660. Each is supported and positioned (provided a projection surface orientation) by a number of UAVs such as multicopters. As shown for screen 610, the screen 610 includes a planar body (e.g., a rectangular sheet of mesh material that is reflective of light at least on one surface or an emissive display, with either configuration having a relatively low wind resistance) 612. Light 613 from a projection assembly (one or more projectors) may be projected onto its surface(s) to provide a light-based display or show to an audience of spectators on the ground 605, which may be a sports arena, a theme or other park, or other outdoor or large indoor environment.

A number of UAVs 614 are operated such as with a GSC using a fleet management module to provide flock-based control over the UAVs (with local control often being used to manage the safe execution of a flight plan for each UAV). Each of the UAVs 614 is linked or connected to a tether or connection point 618 on the body 612 of the projection screen 610 via a tether or connecting line/wire 616. Then, when the UAVs 614 follow the flight plan/show program defining a plurality of way points for each UAV, the projection screen 610 is positioned over the ground 605 to receive the projected light 613 (and with its projection surface(s) oriented as desired such as parallel to the ground 605 or at some particular angle and facing a particular direction).

Such selective movement and positioning of the projection screen 610, 620, 630, 640, 650, and 660 can be seen from looking at FIGS. 6A and 6B. FIG. 6A shows the aerial display 600 with the projections screens 610, 620, 630, 640, 650, and 660 in a first location and with a first angular orientation of their projection surfaces (and shape of the bodies of the screens such as planar or arched or the like).

FIG. 6B shows the aerial display system 600 operating in a second state with each of the projection screens 610, 620, 630, 640, 650, and 660 in a second position (and the same or differing orientation relative to the ground 605). This can be seen by looking at projection screen 610 which has had at least its lower portion supported by the UAVs 614 moved to turn the body 612 (e.g., counterclockwise in the illustrated views). The projectors tracked the movement to continue to provide the projected light 613 on the body 614, and the UAVs 614 are continuing at the second operating state to move 619 the lower portion of the body 612 in this counterclockwise direction or rotation. Each of the other screens, likewise, are moving (or hovering) with their respective UAVs, and, while a relatively simple example, the operating states of system 600 shown in FIGS. 6A and 6B are useful for understanding how a team or flock of UAVs may be used to create a dynamic and exciting aerial display by moving and positioning flexible projection screens that may be emissive displays or be used to reflect light from projectors (as shown at 613).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the screens described herein are generally stressed as being or described as being reflective and/or emissive. In some embodiments of the present described systems/scrims, the screen/scrims may be fully or partially diffusive such that they are useful in cases where the system includes one or more projectors. In other words, the scrims and screens taught herein may be adapted for back or rear projection as they are being supported and moved in the sky or a space above an audience.

We claim:

1. A system for providing an aerial display, comprising:
 a plurality of unmanned aerial vehicles (UAVs);
 a plurality of flexible projection screens, each supportable off the ground in a display air space by one or more of the UAVs; and
 a ground control system with a processor executing a fleet manager module and with memory storing a different flight plan for each of the UAVs, wherein, during a display time period, the UAVs execute the flight plans to move and to position the flexible projection screens within the display air space.

2. The system of claim 1, wherein the flexible projection screens each comprises a mesh body configured to have low wind resistance and to provide a projection surface for reflecting light.

3. The system of claim 2, further comprising a projector projecting light onto the projection surface of at least one of the flexible projection screens during the display time period.

4. The system of claim 3, wherein the projector is adapted to track movement of the at least one of the flexible projection screens to project the light onto the projection surface while the flexible projection screen is positioned at two or more positions or orientations in the display air space.

5. The system of claim 1, wherein the flexible projection screens each comprises an emissive display with air passageways to reduce wind resistance.

6. The system of claim 5, wherein the emissive displays each comprises a plurality of spaced apart light rods connected via a flexible frame, the flexible frame including tether points for connection to the UAVs.

7. The system of claim 6, wherein the light rods each comprises a plurality of sets of light emitting diodes selectively operable to emit differing colors along a length of the light rod.

8. The system of claim 1, wherein the flight plans are downloaded pre-flight to each of the UAVs and wherein during the display time period the UAVs independently and concurrently execute the downloaded flight plans.

9. The system of claim 1, wherein the flight plans are downloaded pre-flight to each of the UAVs and wherein during display time period the UAVs independently and concurrently execute the downloaded flight plans and the fleet manager module communicates instructions to each of the UAVs to control operation of the UAVs during the performance of the aerial display.

10. An aerial display method, comprising:
at a plurality of multicopters, receiving a flight plan unique to each of the multicopters;
concurrently operating the multicopters to execute the flight plans within an air space; and
during the operating of the multicopters, supporting with the multicopters a plurality of projection screens to generate a visual display in the air space.

11. The method of claim 10, further including:
providing a communications channel between pairs of the multicopters;
with a first one of the multicopters detecting a second one of the multicopters in a predefined space proximal to the first one of the multicopters; and
operating the first one of the multicopters in a new manner based on an identity of the second one of the multicopters.

12. The method of claim 10, wherein each of the projection screens comprises a flexible emissive display.

13. The method of claim 12, wherein the flexible emissive displays each comprises a flexible frame supporting a plurality of elongated light rods formed of a plurality of colored light sources and wherein gaps are provided between at least a number of the light rods to provide air passageways to reduce wind resistance.

14. The method of claim 10, wherein each of the projection screens comprises a body with holes providing air passageways and a projection surface on at least a first side that is reflective of light and wherein the method further comprises projecting light upon projection surfaces of the projection screens.

15. An apparatus for use in an aerial display, comprising:
a multicopter,
a display element, with a projection surface, supported and selectively positioned by the multicopter within a display air space; and
a projector assembly projecting light onto the projection surface while the display element is flying through the display air space.

16. The apparatus of claim 15, wherein the projector assembly comprises a media controller projecting the light based on a show program and based on a position of the display element within the display air space.

17. The apparatus of claim 15, wherein the display element comprises a planar, flexible body with the projection surface on a side of the body.

18. The apparatus of claim 16, wherein the body includes air passageways to reduce air resistance.

19. The apparatus of claim 18, wherein the body comprises a sheet of material that is reflective to light on the side of the body containing the projection surface.

20. The apparatus of claim 15, wherein the projector assembly comprises two or more projectors concurrently projecting the light upon the projection surface, whereby the projected light is a blending of two or more light streams on the projection surface.

* * * * *